United States Patent Office  3,099,639  Patented July 30, 1963

3,099,639
STABILIZATION OF 1-OLEFIN POLYMERS
Raymond L. Cobb and Mario P. Marana, Bartlesville, Okla., assignors to Phillips Petroleum Company, a corporation of Delaware
No Drawing. Filed Apr. 21, 1960, Ser. No. 23,628
7 Claims. (Cl. 260—45.95)

This invention relates to the stabilization of normally solid polymers of 1-olefins. In accordance with one aspect, this invention relates to a 1-olefin polymer stabilized against oxidation. In accordance with another aspect, this invention relates to a method for inhibiting oxidation of normally solid 1-olefin polymers.

In recent years, new methods for the preparation of polyolefins by the polymerization of olefins such as ethylene, propylene, butene and copolymerization of these materials have provided many new plastics which have broad utility. However, these polyolefins are subject to oxidative degradation, and in practically all uses for these materials, it is necessary to provide an antioxidant in the polymer composition. Unless antioxidants are provided, the usefulness of these plastics is markedly reduced.

Numerous materials have either been proposed or used as antioxidants for polyolefins, and while some of these antioxidants are moderately successful, research is continuing in search of finding better and cheaper antioxidants to prevent the oxidative degradation of these very useful plastic materials. The present invention relates to novel antioxidants which are highly effective in stabilizing 1-olefin polymers against oxidative degradation.

Accordingly, an object of this invention is to provide 1-olefin polymers stabilized against oxidation.

Another object of this invention is to provide a method for stabilizing 1-olefin polymers against oxidative degradation.

Still another object of this invention is to provide an antioxidant and a method for stabilizing high density polymers of ethylene against oxidative degradation.

Other objects, aspects, as well as the several advantages of the invention, will become apparent to those skilled in the art upon a study of this disclosure and the appended claims.

In accordance with the present invention, it has now been found that certain substituted thio-bis-p-cresols are exceptionally effective antioxidants for 1-olefin polymers. The substituted thio-bis-p-cresols contemplated have the following general structural formula:

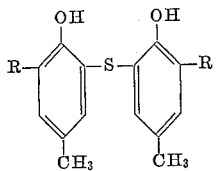

wherein R is a hydrocarbon radical selected from the group consisting of cycloalkyl, alkylcycloalkyl, cycloalkylalkyl, alkylarylalkyl, and aralkyl radicals having from 6 to 10 carbon atoms. The R substituents in the above formula can be the same or different hydrocarbon radicals, as defined.

Examples of some of the materials contemplated in the above-defined formula include 2,2'-thio-bis(6-cyclohexyl-p-cresol), 2,2'-thio-bis(6-methylcyclohexyl-p-cresol), 2,2'-thio-bis(6 - propylcyclohexyl - p - cresol), 2,2'-thio-bis(6-benzyl-p-cresol), 2,2'-thio-bis(6-[2-phenylethyl]-p-cresol), 2,2'-thio-bis(6 - [3 - phenylpropyl]-p-cresol), 2,2'-thio-bis (6-α,α-dimethylbenzyl-p-cresol), 2,2'-thio-bis(6-[4-phenylbutyl]-p-cresol), 2,2'-thio-bis(6 - [3 - butylcyclohexyl]-p-cresol), 2,2'-thio-bis(6-[4-cyclohexylbutyl]-p-cresol), 2,2'-thio-bis(6-[4-n-propylbenzyl] - p - cresol), 3-benzyl-3'-cyclohexyl - 2,2'-dihydroxy-5,5'-dimethyldiphenyl sulfide, and the like.

The antioxidants of this invention can be prepared by any method known in the art. One suitable method of preparing the antioxidants of this invention comprises reacting the corresponding alkylated p-cresol with sulfur dichloride in the ratio of two molecules of the cresol compound to one of sulfur dichloride. However, it should be understood that other methods of preparing these materials can be advantageously employed.

The antioxidants of this invention can be incorporated into the polymer to be stabilized by any suitable means such as hot milling on a roll mill or hot mixing on a Banbury mixer. Generally, the mixing temperature is at least as high as the melting point of the polymers. Also, mixing is generally continued until a uniform composition is obtained. Further, the antioxidant can also be added to a solution or suspension of the polymer followed by precipitation of the polymer and antioxidant or evaporation of the solvent.

The stabilizer or antioxidant of the invention can be incorporated in the polymer to be stabilized in any desired amount depending upon the conditions under which the polymer is to be used. Larger amounts of stabilizer can be used when the article to be protected is exposed to severe light or heat in the presence of oxygen. The amount of stabilizer used is generally in the range of about 0.010 to about 5.0, preferably 0.025 to 1.0, percent by weight based on the olefin polymer. Higher and lower amounts can be utilized, if desired, since these materials are compatible over a very broad range, but amounts outside of this range are not generally practical or economical.

The antioxidants of this invention can be employed in any 1-olefin polymer subject to oxidative degradation which is prepared by various known polymerization methods. Also, the polymer to be stabilized can contain other additives including stress cracking inhibitors, other oxidation inhibitors, vulcanization accelerators, fillers, pigments, and the like. 1-olefin polymers that can be stabilized in accordance with the present invention include solid polymers and copolymers of aliphatic mono-1-olefins such as ethylene, propylene, 1-butene, etc.

The polyolefins or 1-olefin polymers that can be stabilized by the practice of the present invention can be prepared by any of the known methods which are usually employed for the preparation of these polymers. One method of preparing polymers of 1-olefins is the chromium oxide-catalyzed polymerization described in the Hogan et al. patent, 2,825,721 (1958). The polyolefins prepared by the Hogan et al. method are characterized by their high density and high percentage of crystallinity at normal atmospheric temperatures.

In addition to the foregoing method of preparing the 1-olefin polymers, especially polyethylene, the invention also includes within its scope the stabilization of polyolefins prepared by organometal polymerization such as trialkylaluminum in conjunction with a titanium halide, or in polyolefins prepared by the high pressure polymerization processes which employ a peroxide or other oxygen carrier as a catalyst.

Ethylene polymers, including homopolymers and copolymers, prepared by the Hogan et al method often have a molecular weight in the range of 35,000 to 100,000, but can range as high as 200,00, or even higher. Such ethylene polymers frequently have a density in the range of 0.940 to 0.980, ordinarily 0.950 to 0.970, for example, approximately 0.960, and a melt index ranging from 0.2 to 12, preferably 0.2 to 5. Polymers of ethylene produced by this process have unsaturation which is preponderantly of a terminal vinyl and/or transinternal structure. So-called "branched vinyl" unsaturation is substantially absent.

Density of the polymer as used herein is determined by placing a pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity.

The following example will illustrate the present invention in greater detail, but is not to be construed as limiting the invention.

EXAMPLE

Several runs were carried out in which the antioxidants of this invention were synthesized, blended with polyethylene, and tested.

In one run, 2,2'-thio-bis(6-cyclohexyl-p-cresol) was prepared. In this run, 22 grams of 2-cyclohexyl-p-cresol was dissolved in 120 cc. of carbon tetrachloride, and charged to the flask. Another solution was made up by dissolving 5.95 grams of $SCl_2$ in 40 cc. carbon tetrachloride. The $SCl_2$ solution was then added dropwise to the cyclohexylcresol solution at 22–23° C., while stirring, over a two-hour period. Stirring was continued for 1.5 hours after the addition was completed, after which the solvent was evaporated off under reduced pressure. Twenty-six grams of crude product were obtained.

In a similar run, a solution of 5.7 grams $SCl_2$ dissolved in 45 cc. carbon tetrachloride was added dropwise to a solution which was prepared by dissolving 22 grams of 2-benzyl-p-cresol in 140 cc. of carbon tetrachloride. The dropwise addition, carried out while stirring at 2° C., required 1.5 hours. At the end of this time, stirring was continued for 2 more hours at 0–10° C. The resulting solution was left standing overnight at room temperature, and on the following day, the solution was washed with sodium bicarbonate solution and with water, after which it was finally dried over magnesium sulfate. Evaporation of the solvent under reduced pressure resulted in the isolation of 26.5 grams of a crude semi-liquid product.

Samples of the above-prepared antioxidants were then blended into high-density polyethylene, prepared by the chromium oxide-catalyzed polymerization process disclosed by Hogan et al., supra, on a hot roll mill. The polyethylene which was employed had a density of 0.960 and contained 0.02 weight percent of 2,6-di-tert-butyl-4-methylphenol. Following the blending of the desired amount of antioxidant with the polyethylene, the resulting compositions were compression molded, and specimens measuring 4½" x ½" x 1/16" were cut from the sheet by means of dies. These specimens were then placed in aluminum boats formed from heavy aluminum foil and placed in a heated oven in a closed oxygen atmosphere. Gas burettes were connected directly to the system so that the volume of oxygen absorbed by the polymer could be measured. The oven was maintained at 150±3° C., and the oxygen absorption for each sample was checked at regular intervals. The test is usually stopped after the absorption of approximately 25–35 cc. of oxygen. At the beginning of the test, only a very small amount of oxygen is absorbed. As the test proceeds, the antioxidant is consumed by oxidation. When the antioxidant is gone, the polymer takes up oxygen rapidly. The period from the start of the test until the polymer begins to take up large amounts of oxygen is called the induction period.

The results of these runs are expressed below as Table I.

Table I

| Antioxidant | Wt. Percent Antioxidant In Polymer | Induction Period |
| --- | --- | --- |
| 2,2'-thio-bis(6-cyclohexyl-p-cresol) | 0.25 | >285 |
| Do | 0.1 | >166 |
| Do | 0.025 | 25 |
| 2,2'-thio-bis(6-benzyl-p-cresol) | 0.25 | >285 |
| Do | 0.1 | >166 |
| Do | 0.025 | 40 |
| 4,4'-thio-bis(6-tert-butyl-m-cresol) [1] | 0.25 | 260 |
| 2,6-di-tert-butyl-p-cresol [1] | 0.25 | 40–45 |
| Do | 0.1 | 25 |
| Do | 0.025 | 0 |

[1] This is a commercial antioxidant sold for use in various polymers.

It can be seen from the above data that the antioxidants of the invention are superior to commercial antioxidants, and it must be pointed out that these materials are very similar in structure. Thus, it can be seen that slight variations in molecular structure of antioxidants can effect remarkable changes in the ability of these compounds to inhibit oxidative degradation of polymers.

Reasonable modifications are possible within the scope of the disclosure and the appended claims of the present invention, the essence of which is the discovery that certain substituted thio-bis-p-cresols, as defined, are very effective antioxidants for normally solid polymers of 1-olefins, especially high density polymers of ethylene.

We claim:

1. A polymer composition of increased stability against oxidative degradation consisting essentially of a solid polymer of an aliphatic 1-olefin having from 2 to 8 carbon atoms per molecular containing a stabilizing amount of a substituted thio-bis-p-cresol compound having the structural formula:

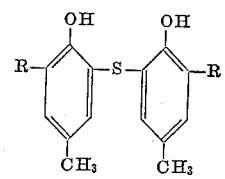

wherein R is a hydrocarbon radical selected from the group consisting of alkylarylalkyl and aralkyl radicals having from 6 to 10 carbon atoms.

2. Composition according to claim 1 wherein said compound is present in amounts ranging from about 0.010 to about 5.0 weight percent based on said polymer.

3. Composition according to claim 1 wherein said polymer is polyethylene.

4. Composition according to claim 1 wherein said compound is 2,2'-thio-bis(6-benzyl-p-cresol).

5. Composition according to claim 1 wherein said compound is 2,2'-thio-bis(6-α,α-dimethylbenzyl-p-cresol).

6. A polymer composition of increased stability against oxidative degradation consisting essentially of a solid polymer of ethylene containing from 0.025 to 1.0 percent by weight based on said polymer of 2,2'-thio-bis(6-benzyl-p-cresol).

7. A polymer composition of increased stability against oxidative degradation consisting essentially of a solid polymer of ethylene containing from 0.025 to 1.0 percent by weight based on said polymer of 2,2'-thio-bis(6-α,α-dimethylbenzyl-p-cresol).

References Cited in the file of this patent

UNITED STATES PATENTS

| | | |
|---|---|---|
| 2,700,691 | Mayes | Jan. 25, 1955 |
| 2,849,517 | Albert | Aug. 26, 1958 |
| 2,964,498 | Taylor | Dec. 13, 1960 |
| 2,985,617 | Salyer et al. | May 23, 1961 |

FOREIGN PATENTS

| | | |
|---|---|---|
| 1,171,286 | France | Sept. 29, 1958 |

OTHER REFERENCES

Raff et al.: "Polyethylene," Interscience Pub. Inc., New York, 1956, pages 103–108.